US009792878B2

(12) United States Patent
Yoon et al.

(10) Patent No.: US 9,792,878 B2
(45) Date of Patent: Oct. 17, 2017

(54) METHOD FOR CONTENT ADAPTATION BASED ON AMBIENT ENVIRONMENT OF ELECTRONIC DEVICE AND ELECTRONIC DEVICE THEREOF

(71) Applicant: Samsung Electronics Co., Ltd., Gyeonggi-do (KR)

(72) Inventors: Su-Ha Yoon, Seoul (KR); Eun-Seok Ryu, Gyeonggi-do (KR); Eui-Chang Jung, Seoul (KR); Su-Young Park, Gyeonggi-do (KR); Cheol-Ho Cheong, Seoul (KR); Jae-Woong Chun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 22 days.

(21) Appl. No.: 14/932,307

(22) Filed: Nov. 4, 2015

(65) Prior Publication Data

US 2016/0133227 A1 May 12, 2016

(30) Foreign Application Priority Data

Nov. 10, 2014 (KR) ........................ 10-2014-0155459

(51) Int. Cl.

*G09G 5/02* (2006.01)
*G09G 3/14* (2006.01)
*G09G 3/20* (2006.01)
*H04N 9/73* (2006.01)

(Continued)

(52) U.S. Cl.

CPC ................. *G09G 5/02* (2013.01); *G09G 3/14* (2013.01); *G09G 2320/0666* (2013.01); *G09G 2360/144* (2013.01); *G09G 2370/02* (2013.01); *G09G 2370/022* (2013.01)

(58) Field of Classification Search

CPC combination set(s) only.
See application file for complete search history.

(56) References Cited

U.S. PATENT DOCUMENTS

2008/0303918 A1* 12/2008 Keithley .................. G09G 3/20 348/223.1
2009/0243515 A1* 10/2009 Kwisthout ............... G09G 3/20 315/307

(Continued)

FOREIGN PATENT DOCUMENTS

JP 2013114192 6/2013
KR 101351884 1/2014

*Primary Examiner* — Wesner Sajous
(74) *Attorney, Agent, or Firm* — The Farrell Law Firm, P.C.

(57) ABSTRACT

An electronic device and method for adapting content based on an ambient environment in the electronic device are provided. The device includes a display interface functionally connecting a content processing module to a display; and the content processing module, wherein the content processing module is configured to receive, from at least one external device external of the electronic device or the at least one external device, ambient color information corresponding for the electronic device or the at least one external device, modify color information for at least a part of first content to be output through the display based on the received ambient color information, and output, based on the modified color information, second content having the modified color information, through the display.

18 Claims, 8 Drawing Sheets

(51) Int. Cl.
*H04N 5/44* (2011.01)
*H04N 5/64* (2006.01)

(56) References Cited

U.S. PATENT DOCUMENTS

| | | | | | |
|---|---|---|---|---|---|
| 2011/0117955 | A1* | 5/2011 | Lee | H04M 1/72569 | 455/550.1 |
| 2012/0206391 | A1* | 8/2012 | Kim | H04M 1/7253 | 345/173 |
| 2013/0135334 | A1 | 5/2013 | Ohwaki | | |
| 2013/0194199 | A1* | 8/2013 | Lynch | G06F 3/0412 | 345/173 |
| 2014/0063074 | A1* | 3/2014 | Drzaic | G09G 3/30 | 345/690 |
| 2014/0132578 | A1 | 5/2014 | Zheng | | |
| 2015/0141113 | A1* | 5/2015 | Melnick | G07F 17/34 | 463/20 |
| 2016/0063951 | A1* | 3/2016 | Ikizyan | G09G 5/02 | 345/590 |

* cited by examiner

METHOD FOR CONTENT ADAPTATION BASED ON AMBIENT ENVIRONMENT OF ELECTRONIC DEVICE AND ELECTRONIC DEVICE THEREOF

PRIORITY

This application claims priority under 35 U.S.C. §119(a) to Korean Patent Application. Serial No. 10-2014-0155459, which was filed in the Korean Intellectual Property Office on Nov. 10, 2014, the entire content of which is incorporated herein by reference.

BACKGROUND

1. Field of the Invention

The present invention relates to an electronic device and, more particularly, to a method and an electronic device for content adaptation based on an ambient environment of the electronic device.

2. Description of the Related Art

Electronic devices can display various types of multimedia content through displays thereof. Along with the development of technologies for electronic devices, electronic device users have been requiring more improvements to display screens and content.

Electronic device users may have different display environments according to ambient lighting conditions. If the users' viewing environment changes, even though the electronic devices display the same content through displays configured in the same manner, the content may look different to the users' eyes, compared to before the change of the viewing environment. To address this difference, some electronic devices may modify information relating to the displays to provide improved display screens and content.

An electronic device may control the intensity of illumination of a display in order to display an image adapted to a change in the intensity of surrounding illumination therearound. For example, when the intensity of illumination around the electronic device has increased, the electronic device may increase the intensity of illumination of the display to display a screen adapted to the intensity of illumination therearound.

When an electronic device and a user's pupil sense different ambient intensities of illumination, the electronic device does not accurately reflect, in a display, the intensity of illumination to which the user's pupil responds. For example, when it is dark around the electronic device, but a bright light is located around the user, the user's pupil contracts in response to the bright light therearound to receive only a small amount of light. When a bright light is located opposite to the user with respect to the electronic device, the user's pupil contracts in response to the bright light to receive a small amount of light. In this situation, if the electronic device decreases the intensity of illumination set for the display on the basis of the low intensity of illumination acquired through a sensor that is mounted on a surface of the electronic device orienting toward the user, the display may look very dark to the user whose pupil has already contracted.

In addition, since the electronic device modifies the intensity of illumination of the display itself and does not modify the color information of content itself, the electronic device fails to provide content more accurately adapted to ambient color information. For example, even when the ambient color of the electronic device is changed into a particular color (e.g., a reddish color) due to an influence of a light around the electronic device, the electronic device modifies the intensity of illumination of the display and fails to modify the color information of content. Accordingly, the electronic device provides the content including the distorted color information.

Furthermore, since the electronic device modifies the color information of the display based on the ambient color information and fails to control devices therearound on the basis of the color information of content, there is a limitation in creating the user's viewing environment. For example, since the electronic device passively adapts to the continuously changed ambient color information, the electronic device cannot accurately adapt and display content according to the user's intention, or must frequently perform adaptive operations.

SUMMARY

An aspect of the present invention is to provide a method for content adaptation based on an ambient environment of an electronic device and an electronic device thereof that can output second content with modified color information for at least a part of first content based on ambient color information for a user.

Another aspect of the present invention is to provide a method for content adaptation based on an ambient environment of an electronic device and an electronic device thereof that can control an external device based on color information of content displayed through a display.

According to an aspect of the present invention, an electronic device comprising a display interface functionally connecting a content processing module to a display; and the content processing module, wherein the content processing module is configured to receive, from at least one external device of the electronic device, ambient color information for the electronic device or the at least one external device, modify color information for at least a part of first content to be output through the display based on the received ambient color information, and output, based on the modified color information, second content having modified color information, through the display.

According to another aspect of the present invention an electronic device is provided. The electronic device includes a display; and a content processing module functionally connected to the display; wherein the content processing module is configured to display first content through the display, display second content having at least one piece of different color information from color information of the first content, and control at least one external device of the electronic device based on the at least one piece of color information.

According to another aspect of the present invention, a method for adapting content based on an ambient environment of an electronic device is provided. The method includes receiving a request for first content from at least one external device of the electronic device; receiving, from the at least one external device, ambient color information for the electronic device or the at least one external device; acquiring second content with modified color information for at least a part of the first content, based on the ambient color information; and displaying, in response to the request, the acquired second content through a display functionally connected to the electronic device.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
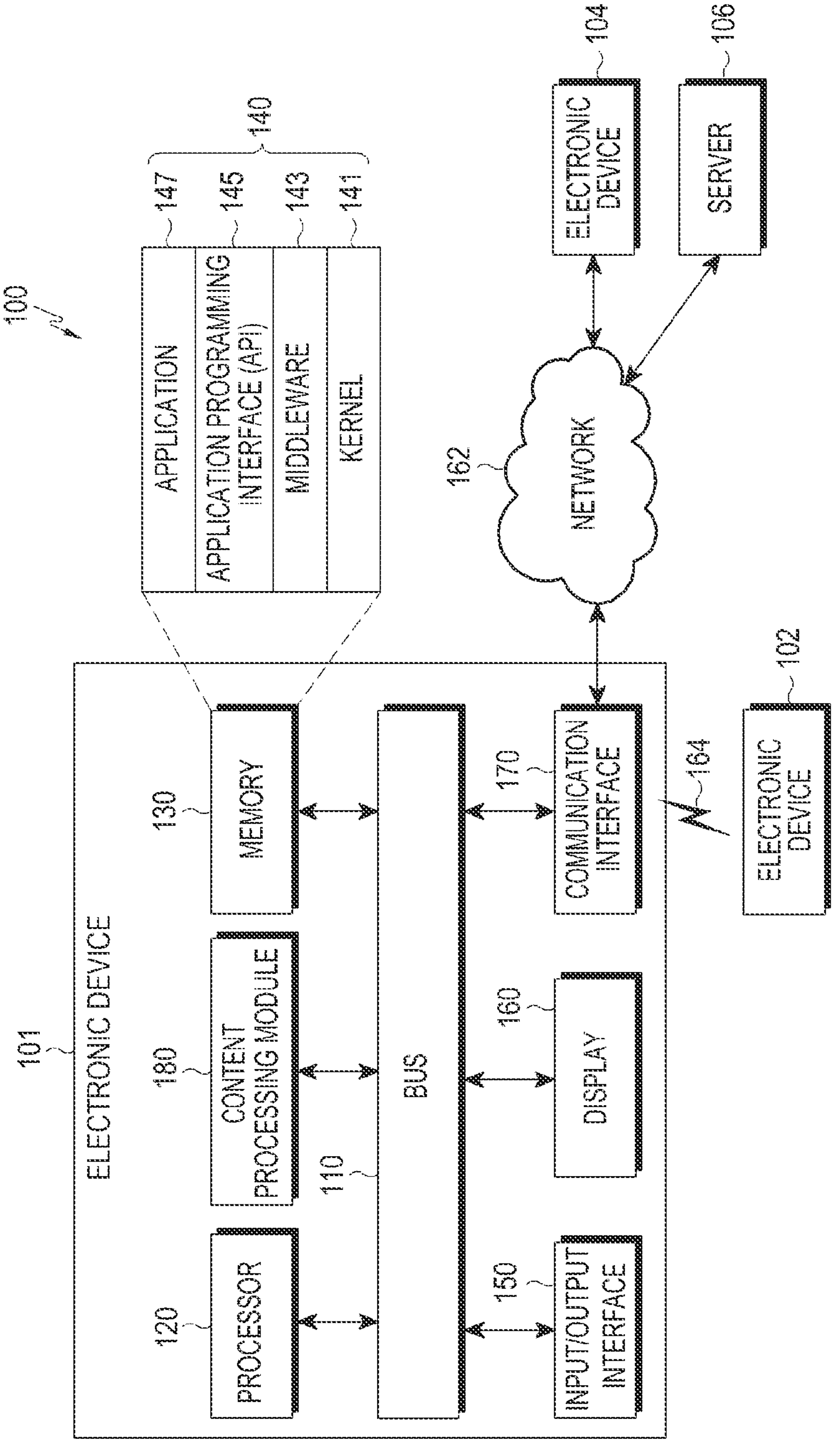
FIG. 1 is a diagram illustrating a network environment including an electronic device according to an embodiment of the present invention.

Various embodiments of the present invention are described as follows with reference to the accompanying drawings. In the following descriptions of the drawings, similar reference numerals may be used to designate the same or similar elements.

Herein, the expressions "have", "may have", "include", or "may include" refer to the existence of a corresponding feature (e.g., a numeral, a function, an operation, or a constituent element, such as a component), but does not exclude additional features.

Herein, the expressions "A or B", "at least one of A and B", and "one or more of A and B" include all possible combinations of the items listed. More specifically, these expressions refer to combinations including any of (1) at least one of A, (2) at least one of B, and (3) at least one of A and at least one of B.

The expressions "first" and "a second", as used herein with respect to various embodiments of the present invention may modify various components, regardless of the order and/or the importance of the components, but does not limit the corresponding components. For example, a first user device and a second user device indicate different user devices, although both of the devices are user devices. For example, a first element may be referred to as a second element, and similarly, a second element may be referred to as a first element without departing from the scope of embodiments of the present invention.

When an element (e.g., first element) is referred to as being (operatively or communicatively) "connected," or "coupled," to another element (e.g., second element), the element may be directly connected or coupled directly to the other element or any other element (e.g., third element) may be interposer between these elements. By contrast, when an element (e.g., first element) is referred to as being "directly connected," or "directly coupled" to another element (second element), there are no other elements (e.g., third element) interposed between the pair of elements.

The expression "configured to", as used herein, may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expressions "adapted to" and "device configured to" may refer to an operation that the device is able to perform, alone or together with other devices or components. For example, the phrase "processor adapted (or configured) to perform A, B, and C" may refer to a dedicated processor (e.g. an embedded processor) only for performing the corresponding operations or a generic-purpose processor (e.g., a central processing unit (CPU) or an application processor (AP)) that can perform the corresponding operations by executing one or more software programs stored in a memory device.

The terms are used herein merely for the purpose of describing particular embodiments of the present invention, and are not intended to limit the scope of other embodiments of the present invention. As used herein, singular forms may include plural forms as well, unless the context clearly indicates otherwise. Unless defined otherwise, all terms used herein, including technical terms and scientific terms, may have the same definition as commonly understood by a person of ordinary skill in the art to which the present disclosure pertains. Terms such as those defined in a generally used dictionary may be interpreted to have the definitions equivalent to their contextual definitions in the relevant field of art, and are not to be interpreted to have ideal or excessively formal definitions unless clearly defined herein. In some cases, even when a term defined herein, the term should not be interpreted in a manner that excludes embodiments.

For example, an electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), a motion picture experts group (MPEG) audio layer-3 (MP3) player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to some embodiments of the present invention, the electronic device may be a smart home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present invention, an electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), an Flight Data Recorder (FDR), a Vehicle Infotainment Device, an electronic device for a ship (e.g., a navigation device for a ship, and a gyro-compass), avionics, a security device, an automotive head unit, a robot for home or industry, an automatic teller machine (ATM) in a bank, point of sales (POS) in a shop, or an internet of things (IoT) device (e.g., a light bulb, various sensors, electric or gas meter, a sprinkler device, a fire alarm, a thermostat, a streetlamp, a toaster, sporting goods, a hot water tank, a heater, a boiler, etc.).

According to some embodiments of the present invention, an electronic device may include at least one of a part of furniture or a building/structure, an electronic board, an electronic signature receiving device, a projector, and various kinds of measuring instruments (e.g., a water meter, an electric meter, a gas meter, and a radio wave meter). An electronic device according to an embodiment of the present invention may be a combination of one or more of the aforementioned various devices. An electronic device according to an embodiment of the present invention may be a flexible device. Further, electronic devices according to embodiments of the present invention are not limited to the aforementioned devices, and may include a new electronic device according to technological developments.

Hereinafter, electronic devices according to various embodiments are described with reference to the accompanying drawings. Herein, the term "user" may indicate a person who uses an electronic device or a device (e.g., an artificial intelligence electronic device) that uses an electronic device.

FIG. 1 is a diagram illustrating a network environment including an electronic device according to an embodiment of the present invention.

Referring to FIG. 1, an electronic device 101 is located in a network environment 100. The electronic device 101 includes a bus 110, a processor 120, a memory 130, an input/output interface 150, a display 160, a communication interface 170, and a content processing module 180. According to an embodiment of the present invention, the electronic device 101 may include at least one of the above elements and/or other additional elements.

The bus 110 may include a circuit for interconnecting the bus 110 to the content processing module 180 and transferring communication (e.g., control messages and/or data) between these elements.

The processor 120 may include one or more of a Central Processing Unit (CPU), an Application Processor (AP), and a Communication Processor (CP). For example, the processor 120 may carry out operations or data processing related to control and/or communication with respect to at least one other element of the electronic device 101.

The memory 130 may include a volatile memory and/or a non-volatile memory. The memory 130 may store, for example, instructions or data related to one or more other elements of the electronic device 101. According to an embodiment, the memory 130 may store software and/or a program 140. The program 140 includes, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 controls or manages system resources (e.g., the bus 110, the processor 120, or the memory 130) used for executing an operation or function implemented by other programs (e.g., the middleware 143, the API 145, or the applications 147). In addition, the kernel 141 provides an interface through which the middleware 143, the API 145, or the application programs 147 access the individual elements of the electronic device 101 to control or manage the system resources.

The middleware 143 serves as, for example, a relay for allowing the API 145 or the application programs 147 to communicate with the kernel 141 to exchange data.

Furthermore, the middleware 143 processes one or more task requests received from the application programs 147 according to priorities thereof. For example, the middleware 143 may assign, to at least one of the application programs 147, a priority to use a system resource (e.g., the bus 110, the processor 120, or the memory 130) of the electronic device 101. For example, the middleware 143 may perform scheduling or load balancing on one or more task requests by processing the one or more task requests according to the priority assigned to the at least one application program.

The API 145 is an interface through which the applications 147 control functions provided by the kernel 141 or the middleware 143, and may include at least one interface or function (e.g., an instruction) for file control, window control, image processing, or text control.

The input/output interface 150 serves as an interface that transfers instructions or data input from a user or an external device to the other element(s) of the electronic device 101. Furthermore, the input/output interface 150 outputs instructions or data received from the other element(s) of the electronic device 101 to the user or an external device.

The display 160 may include, for example, a Liquid Crystal Display (LCD), a Light Emitting Diode (LED) display, an Organic Light Emitting Diode (OLED) display, a Micro Electro Mechanical Systems (MEMS) display, or an electronic paper display. The display 160 may display various types of contents (e.g., text, images, videos, icons, or symbols) for users. The display 160 may include a touch screen and receive, for example, a touch input, a gesture input, a proximity input, or a hovering input using an electronic pen or a user's body part.

The communication interface 170 performs communication between the electronic device 101 and an external device (e.g., a first external device 102, a second external device 104, or a server 106). For example, the communication interface 170 may be connected to a network 162 through wireless or wired communication to communicate with the external device (e.g., the second external device 104 or the server 106).

Wireless communication may be performed by using, at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM) as a cellular communication protocol. In addition, wireless communication may include, for example, short range communication. Short range communication may be performed by using, for example, at least one of WiFi, Bluetooth, Near Field Communication (NFC), and a Global Positioning System (GPS). Wired communication may be performed by using, for example, at least one of a Universal Serial Bus (USB), a High Definition Multimedia Interface (HDMI), Recommended Standard 232 (RS-232), an Inter-Integrated Circuit (I2C), an Inter-Integrated circuit Sound (I2S), Peripheral Component Interconnect (PCI), a Universal Asynchronous Receiver Transmitter (UART), and a Plain Old Telephone Service (POTS). The network 162 may include at least one of communication networks such as a computer network (e.g., a LAN or a WAN), the Internet, and a telephone network.

The content processing module 180 is functionally connected to other elements (e.g., the bus 110, the processor 120, the memory 130, the input/output interface 150, the display 160, and the communication interface 170) of the electronic device 101 to process content (e.g., a drama, a movie, news, etc.). For example, the content processing module 180 may acquire ambient environment information (e.g., ambient color information for an electronic device user) from other external devices 102, 104, and 106, external to the electronic device 101. The content processing module 180 may also modify color information for content to be output through the display 160 based on the ambient environment information. Furthermore, the content processing module 180 may output the modified content through the display 160. Moreover, the content processing module 180, when the color information for the content is modified, may control an external device based on the modified color information.

The content processing module 180 may be integrated with the processor 120, and may be stored in the form of software in the memory 130 and executed in the processor 120. In addition, the content processing module 180 may be distributed in the processor 120 and the memory 130. Additional information on the content processing module 180 is provided later herein with reference to FIGS. 4 to 8.

The first and second external devices 102 and 104 may be the same or different device types from the electronic device 101. According to an embodiment of the present invention, the server 106 may include a group of one or more servers. According to an embodiment of the present invention, all or some of the operations performed in the electronic device 101 may be carried out by another electronic device or by a plurality of electronic devices (e.g., the electronic device 102, 104 or server 106). According to an embodiment of the present invention, when the electronic device 101 must perform any function or service automatically or in response to a request, the electronic device 101 may request another device 102 or 104 or the server 106 to perform at least some functions related to the function or service, additionally or instead of autonomously executing the function or service by the electronic device 101 itself. The other electronic device 102 or 104, or the server 106 may carry out the requested function or the additional function and transfer the result, obtained by carrying out the function, to the electronic device 101. The electronic device 101 may process the received result as it is or additionally to provide the requested function or service. For example, a cloud computing technology, a distributed computing technology, or a client-server computing technology may be used to carry out the function.

Figure 2:
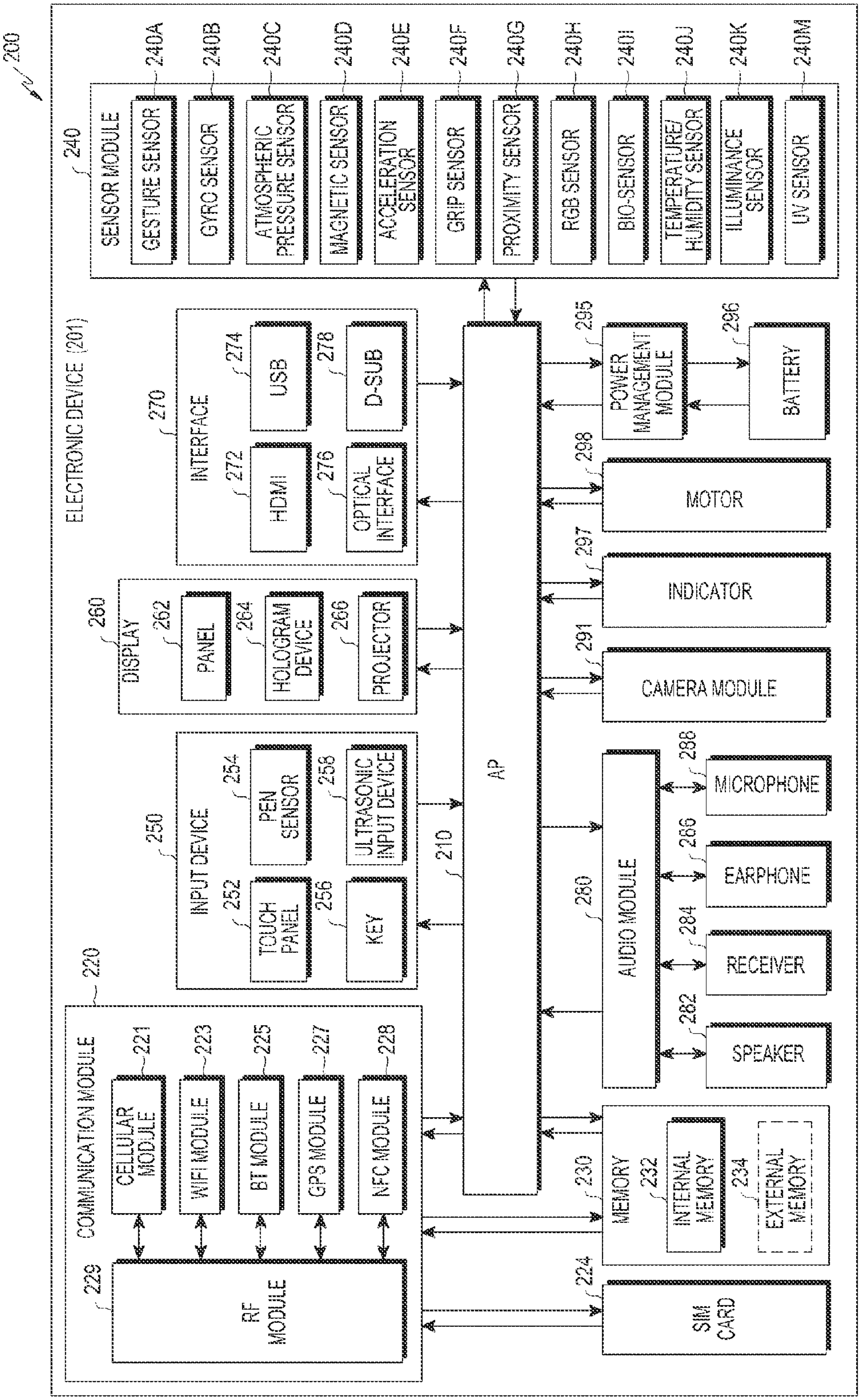
FIG. 2 is a block diagram illustrating an electronic device according to an embodiment of the present invention.

FIG. 2 is a block diagram illustrating an electronic device according to an embodiment of the present invention.

Referring to FIG. 2, an electronic device 201 may include, for example, all or some of the elements of the electronic device 101 illustrated in FIG. 1. The electronic device 201 includes at least one Application Processor (AP) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The processor 210 controls a plurality of hardware or software elements connected to the processor 210 by driving an operating system or an application program, and performs various types of data processing and calculations. The processor 210 may be implemented by, for example, a System on Chip (SoC). According to an embodiment of the present invention, the processor 210 may further include a Graphic Processing Unit (GPU) and/or an image signal processor. The processor 210 may include some (e.g., a cellular module 221) of the other elements illustrated in FIG. 2. The processor 210 may load instructions or data received from at least one other element (e.g., a non-volatile memory) in a volatile memory, process the loaded instructions or data, and store various types of data in a non-volatile memory.

The communication module 220 may have a configuration the same as or similar to the communication interface 170 of FIG. 1. The communication module 220 includes, for example, a cellular module 221, a WiFi module 223, a BT module 225, a GPS module 227, an NFC module 228, and a Radio Frequency (RF) module 229.

The cellular module 221 may provide, for example, a voice call, a video call, a text message service, or an Internet service through a communication network. According to an embodiment of the present invention, the cellular module 221 may distinguish and authenticate the electronic device 201 in a communication network using a SIM (e.g., the SIM card 224). According to an embodiment of the present invention, the cellular module 221 may perform at least some of functions providable by the processor 210. According to an embodiment of the present invention, the cellular module 221 may include a Communication Processor (CP).

The WiFi module 223, the BT module 225, the GPS module 227, or the NFC module 228 may include a processor for processing data transmitted/received through the corresponding module. According to an embodiment of the present invention, at least two of the cellular module 221, the WiFi module 223, the BT module 225, the GPS module 227, and the NFC module 228 are included in one Integrated Chip (IC) or IC package.

The RF module 229 transmits/receives, for example, a communication signal (e.g., a Radio Frequency (RF) signal). The RF module 229 may include, for example, a transceiver, a Power Amp Module (PAM), a frequency filter, a Low Noise Amplifier (LNA), or an antenna. According to another embodiment of the present invention, at least one of the cellular module 221, the WiFi module 223, the BT module 225, the GPS module 227, and the NFC module 228 may transmit/receive an RF signal through a separate RF module.

The subscriber identification module 224 may include, for example, a card including a subscriber identification module and/or an embedded SIM, and may further include unique identification information (e.g., an Integrated Circuit Card Identifier (ICCID)) or subscriber information (e.g., International Mobile Subscriber Identity (IMSI)).

The memory 230 (e.g., the memory 130) includes, for example, an internal memory 232 or an external memory 234. The internal memory 232 may include at least one of, for example, a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a flash memory (e.g., a NAND flash memory or a NOR flash memory), a hard driver, or a Solid State Drive (SSD).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 234 may be functionally and/or physically connected to the electronic device 201 through various interfaces.

The sensor module 240 measures a physical quantity or detects an operating state of the electronic device 201 and converts the measured or detected information into an electrical signal. The sensor module 240 includes at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red/Green/Blue (RGB) sensor), a biometric sensor 240I, a temperature/humidity sensor 240J, an illumination sensor 240K, and an Ultra Violet (UV) sensor 240M. The sensor module 240 may additionally or alternatively include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. According to an embodiment of the present invention, the electronic device 201 may further include a processor, as a part of the processor 210 or a separate element therefrom, which is configured to control the sensor module 240, and may control the sensor module 240 while the processor 210 is in a sleep state.

The input device 250 includes, for example, a touch panel 252, a (digital) pen sensor 254, a key 256, or an ultrasonic input device 258. The touch panel 252 may use, for example, a capacitive type, a resistive type, an infrared type, and an ultrasonic type. Furthermore, the touch panel 252 may further include a control circuit. The touch panel 252 may further include a tactile layer and provide a tactile reaction to the user.

The (digital) pen sensor 254 may be a part of the touch panel or may include a separate recognition sheet. The key 256 includes, for example, a physical button, an optical key or a keypad. The ultrasonic input device 258 detects ultrasonic waves generated by an input tool through microphone 288 and identifies data corresponding to the detected ultrasonic waves.

The display 260 (e.g., the display 160) includes, for example, a panel 262, a hologram device 264 or a projector 266. The panel 262 may include a configuration the same as or similar to the display 160 illustrated in FIG. 1. The panel 262 may be implemented to be, for example, flexible, transparent, or wearable. The panel 262 may be formed to be a single module together with the touch panel 252. The hologram device 264 shows a three dimensional image in the air using interference of light. The projector 266 displays an image by projecting light onto a screen. The screen may be located, for example, inside or outside the electronic device 201. According to an embodiment of the present invention, the display 260 may further include a control circuit for controlling the panel 262, the hologram device 264, or the projector 266.

The interface 270 includes, for example, a High-Definition Multimedia Interface (HDMI) 272, a Universal Serial Bus (USB) 274, an optical interface 276, or a D-subminiature (D-sub) 278. The interface 270 may be included, for example, in the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some elements of the audio module 280 may be included, for example, in the input/output interface 150 illustrated in FIG. 1. The audio module 280 processes sound information that is input or output through, for example, a speaker 282, a receiver 284, earphones 286, the microphone 288, or the like.

The camera module 291 is a device that can photograph a still image and a moving image. According to an embodiment of the present invention, the camera module 291 may include one or more image sensors (e.g., a front sensor or a back sensor), a lens, an Image Signal Processor (ISP), or a flash (e.g., an LED or a xenon lamp).

The power management module 295 manages, for example, the power of the electronic device 201. According to an embodiment of the present invention, the power management module 295 may include a Power Management Integrated Circuit (PMIC), a charger Integrated Circuit (IC), or a battery gauge. The PMIC may utilize a wired and/or wireless charging scheme. A magnetic resonance scheme, a magnetic induction scheme, and an electromagnetic scheme are examples wireless charging methods that may be used. An additional circuit for wireless charging, such as a coil loop circuit, a resonance circuit, a rectifier circuit, etc. may be added. The battery gauge may measure, for example, a residual quantity of the battery 296, and a voltage, a current, or a temperature while charging. The battery 296 may include, for example, a rechargeable battery or a solar battery.

The indicator 297 displays an indication of a particular state of the electronic device 201 or a part thereof (e.g., the processor 210), such as a boot-up state, a message state, a charging state, etc. The motor 298 converts an electrical signal into a mechanical vibration, and may generate a vibration or a haptic effect. Although not illustrated, the electronic device 201 may include a processing unit (e.g., a Graphical Processing Unit (GPU)) for supporting mobile TV. The processing unit for supporting mobile TV may, for example, process media data according to a certain standard such as Digital Multimedia Broadcasting (DMB), Digital Video Broadcasting (DVB), or MediaFlo™.

Each of the above-described component elements of hardware according to embodiments of the present invention may be configured with one or more components, and the names of the corresponding component elements may vary based on the type of electronic device. An electronic device according to an embodiment of the present invention may include at least one of the aforementioned elements. Some elements may be omitted or other additional elements may be further included in accordance with embodiments of the present invention. Some of the hardware components according to various embodiments may be combined into one entity that performs functions identical to those of the relevant separate components before the combination.

Figure 3:
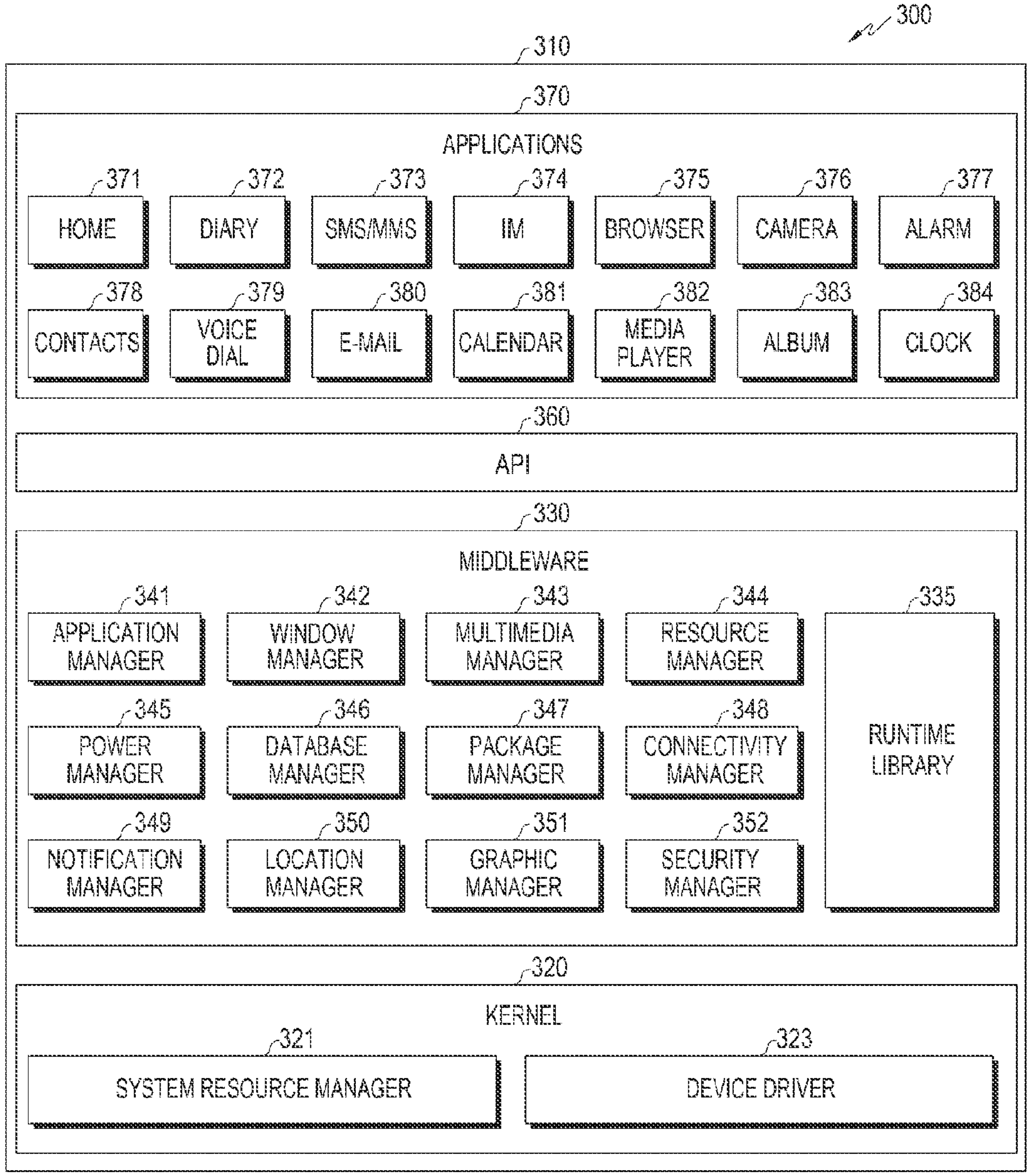
FIG. 3 is a block diagram illustrating a programming module according to an embodiment of the present invention.

FIG. 3 is a block diagram illustrating a program module according to an embodiment of the present invention.

Referring to FIG. 3, according to an embodiment of the present invention, a program module 310 (e.g., the program 140) may include an Operating System (OS) for controlling resources related to an electronic device (e.g., the electronic device 101) and/or various applications (e.g., the application programs 147) driven in the operating system. The operating system may be, for example, Android, iOS, Windows, Symbian, Tizen, Bada, etc.

The programming module 310 includes a kernel 320, middleware 330, an Application Programming Interface (API) 360, and/or applications 370. At least a part of the program module 310 may be preloaded in the electronic device or downloaded from an external electronic device 102 or 104, or the server 106.

The kernel 320 (e.g., the kernel 141) includes, for example, a system resource manager 321 and/or a device driver 323. The system resource manager 321 controls, allocates, or collects system resources. According to an embodiment of the present invention, the system resource manager 321 may include a process manager, a memory manager, or a file system manager. The device driver 323 may include, for example, a display driver, a camera driver, a Bluetooth driver, a shared-memory driver, a USB driver, a keypad driver, a WiFi driver, an audio driver, or an Inter-Process Communication (IPC) driver.

The middleware 330 provides a function required by the applications 370 in common or provides various functions to the applications 370 through the API 360, so that the applications 370 can efficiently use limited system resources within the electronic device. According to an embodiment of the present invention, the middleware 330 (e.g., the middleware 143) includes, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 includes, for example, a library module that a compiler uses to add new functions through a programming language while the applications 370 are executed. The run time library 335 performs input/output management, memory management, or a function for an arithmetic function.

The application manager 341 manages, for example, the life cycle of at least one of the applications 370. The window manager 342 manages Graphical User Interface (GUI) resources used by a screen. The multimedia manager 343 identifies formats required for the reproduction of various media files, and may encode or decode the media files using a codec appropriate for the corresponding format. The resource manager 344 manages resources such as a source code, a memory, and a storage space of at least one of the applications 370.

The power manager 345 may operate together with a Basic Input/Output System (BIOS) to manage a battery or power, and may provide power information required for the operation of the electronic device. The database manager 346 may generate, search for, or change a database to be used by at least one of the applications 370. The package manager 347 manages installation or updating of applications distributed in the form of a package file.

The connectivity manager 348 manages wireless connection of, for example, WiFi or Bluetooth devices. The notification manager 349 displays or notifies a user of an event, such as an arrival message, appointment, proximity notification, and the like, in such a manner that a user is not disturbed. The location manager 350 manages location information of the electronic device. The graphic manager 351 manages graphic effects to be provided to a user and user interfaces related to the graphic effects. The security manager 352 provides all security functions required for system security or user authentication. According to an embodiment of the present invention, when the electronic device (e.g., electronic device 101) has a telephone call function, the middleware 330 may further include a telephony manager for managing a voice call function or a video call function of the electronic device.

The middleware 330 may include a middleware module for forming a combination of various functions of the aforementioned elements. The middleware 330 may provide modules specialized according to types of operating systems in order to provide differentiated functions. Furthermore, the middleware 330 may dynamically remove some of the existing elements or add new elements.

The API 360 (e.g., the API 145) is, for example, a set of API programming functions, and may include different configurations according to operating systems. For example, for Android or iOS, one API set may be provided to each platform, and for Tizen, two or more API sets may be provided to each platform.

The applications 370 (e.g., the application program 147) includes, for example, one or more applications that can provide functions such as home 371, dialer 372, SMS/MMS 373, Instant Message (IM) 374, browser 375, camera 376, alarm 377, contacts 378, voice dial 379, e-mail 380, calendar 381, media player 382, album 383, clock 384, health care (e.g., measure exercise quantity or blood sugar), or environment information (e.g., atmospheric pressure, humidity, or temperature information).

According to an embodiment, the applications 370 may include an application (hereinafter, referred to as an "information exchange application" for convenience of the description) supporting information exchange between the electronic device 101 and an external electronic device 102 or 104. The information exchange application may, for example, include a notification relay application for transferring particular information to an external electronic or a device management application for managing an external device.

For example, the notification relay application may include a function of transferring, to an external device 102 or 104, notification information generated from other applications of the electronic device 101 (e.g., an SMS/MMS application, an e-mail application, a health care application, or an environmental information application). Furthermore, the notification relay application may, for example, receive notification information from an external electronic device and provide the received notification information to a user.

The device management application may manage (e.g., install, delete, or update), for example, at least one function of an external device 102 or 104 communicating with the electronic device (e.g., a function of turning on/off the external device itself (or some elements thereof) or a function of adjusting luminance (or resolution) of a display), applications executed in the external electronic device, or services provided from the external electronic device (e.g., a telephone call service or a message service).

According to an embodiment of the present invention, the applications 370 may include applications (e.g., a health care application of a mobile medical appliance) designated according to the attributes of the external electronic device 102 or 104. According to an embodiment of the present invention, the applications 370 may include an application received from the external electronic device (e.g., the server 106, or the electronic device 102 or 104). According to an embodiment of the present invention, the applications 370 may include a preloaded application or a third party application which can be downloaded from the server. Names of the elements of the program module 310, according to the above described embodiments of the present invention, may vary depending on the type of operating system.

According to various embodiments of the present invention, at least some of the programming modules 310 may be implemented in software, firmware, hardware, or a combination of two or more thereof. At least a part of the programming modules 310 may be implemented (e.g., executed), for example, by a processor (e.g., the AP 210). At least a part of the programming modules 310 may include, for example, a module, a program, a routine, sets of instructions, or a process for performing one or more functions.

The term "module" as used herein may, for example, mean a unit including one of hardware, software, and firmware or a combination of two or more of these units. The "module" may be interchangeably used with, for example, any of the terms "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to an embodiment of the present invention may include at least one of an Application-Specific Integrated Circuit (ASIC) chip, a Field-Programmable Gate Arrays (FPGA), and a programmable-logic device for performing operations which has been known or are to be developed hereinafter.

According to various embodiments of the present invention, at least some of the devices (e.g., modules or functions thereof) or the method (e.g., operations) according to the present disclosure may be implemented by a command stored in a computer-readable recording medium in a programming module form. The instruction, when executed by a processor (e.g., the processor 120), may cause the one or more processors to execute the function corresponding to the instruction. The computer-readable recording medium may be, for example, the storage unit 130.

A computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present invention, and vice versa.

A programming module according to an embodiment of the present invention may include one or more of the aforementioned components or may further include other additional components, or some of the aforementioned components may be omitted. Operations executed by a module, a programming module, or other component elements according to an embodiment of the present invention may be executed sequentially, in parallel, repeatedly, or in a heuristic manner. Further, some operations may be executed according to another order or may be omitted, or other operations may be added, in accordance with embodiments of the present invention.

Further, embodiments of the present invention described herein are merely provided to facilitate an understanding of technical contents, and do not limit the scope of embodiments of the present invention.

Figure 4:
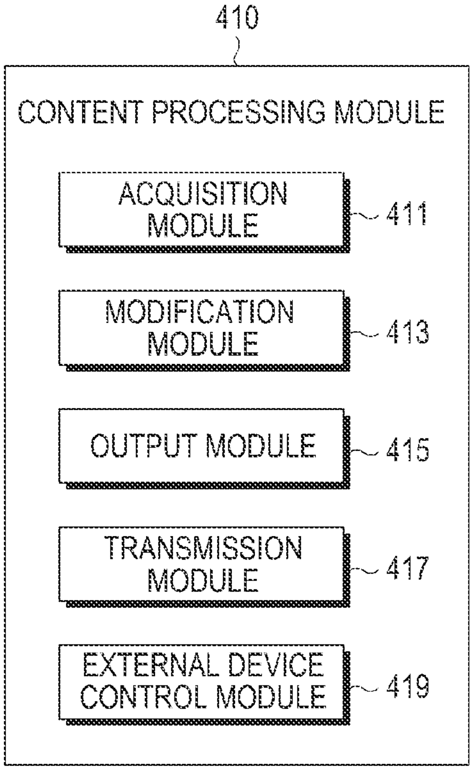
FIG. 4 is a block diagram illustrating a content processing module according to an embodiment of the present disclosure.

FIG. 4 is a block diagram illustrating a content processing module, which may be included in an electronic device (e.g., the electronic device 101), according to an embodiment of the present invention.

Referring to FIG. 4, a content processing module 410 includes an acquisition module 411, a modification module 413, an output module 415, a transmission module 417, and an external device control module 419. According to an alternative embodiment of the present invention, any of the acquisition module 411, the modification module 413, the output module 415, the transmission module 417, and the external device control module 419 may not be included in the content processing module 410. The content processing module 410 may correspond to the content processing module 180 illustrated in FIG. 1.

According to an embodiment of the present invention, the acquisition module 411 acquires ambient color information for a user or the electronic device, or at least one piece of content to be output through a display functionally connected to the electronic device. For example, the acquisition module 411 may acquire the ambient color information for the electronic device through a sensor (e.g., the sensor module 240) included in the electronic device. The acquisition module 411 may acquire the ambient color information for the user through an external device (e.g., a sensor) adjacent to the user, from at least one of the external device and another external device (e.g., the server 106). Herein, "ambient color information for the user" and "ambient color information for the electronic device" refer to color information regarding ambient colors near a user or a device of the user. The acquisition module 411 may periodically acquire at least one of the ambient color information for the electronic device or the user, or the content.

The external device may be, for example, a device adjacent to the user. For example, the external device may be an electronic device (e.g., smart glasses, a head mounted device, a smart watch, an electronic tattoo, electronic clothes, earphones, microphone, or the like) that may be worn on the user's body. The external device may be, for example, a device (e.g., a lighting device, a blind, a filter, a remote control, or the like) that may control ambient color information. The external device may be, for example, a device (e.g., a camera, a CCTV, a home gateway, or the like) mounted on various indoor places (e.g., furniture, a wall, a ceiling, or the like). The external device is not limited to the aforementioned devices, and various devices around the user may be included in the external device in an Internet of Things (IoT) environment.

The sensor may include, for example, at least one of a color sensor (e.g., a Red/Green/Blue (RGB) sensor, an illumination sensor, and an Infrared (IR) sensor. For example, the sensor may be included in a camera (e.g., an in-cell type camera included in a lens of smart glasses). The sensor may be configured using some pixels included in the camera. A sensor according to embodiments of the present invention is not limited to the aforementioned sensors, and the sensor may be included in various external devices.

The color information may include, for example, at least one of a red component, a green component, a blue component, a hue, saturation, brightness, luminance, and chrominance. When using the RGB color model, the color information may include, for example, at least one of a red component, a green component, and a blue component. When using the hue-saturation-value (HSV) color model, the color information may include, for example, at least one of a hue, saturation, and brightness. In the case of the luminance/blue difference chroma/red difference chroma (YCbCr) color model, the color information may include, for example, at least one of luminance, blue chrominance, and red chrominance. Color information may be defined by different color models from the aforementioned color models.

According to an embodiment of the present invention, the acquisition module 411 acquires ambient color information for the electronic device through a plurality of sensors. For example, the acquisition module 411 may acquire the ambient color information through at least one of a first sensor (e.g., a front sensor) mounted on a first surface (e.g., the front surface) of the electronic device and a second sensor (e.g., a rear sensor) mounted on a second surface (e.g., the rear surface) of the electronic device. For example, the acquisition module 411 may acquire first ambient color information for the electronic device, relating to a first direction, through the first sensor or may acquire second ambient color information for the electronic device, relating to a second direction, through the second sensor. For example, the first ambient color information relates to light received from a first direction relative to the electronic device through the first sensor, and the second ambient color information is relating to light received from a second direction relative to the electronic device through the second sensor.

According to an embodiment of the present invention, the acquisition module 411 acquires ambient color information based on a determination that the ambient color information is included in a particular range. For example, when it is determined that a numerical value of the ambient color information for the electronic device or the user is at least equal to a threshold value, the acquisition module 411 may acquire the ambient color information. For example, when it is determined that the numerical value is at least equal to the threshold value, the acquisition module 411 may store, in a memory (e.g., the memory 130), the ambient color information acquired through the electronic device or external device. When it is determined that the numerical value is less than the threshold value, the acquisition module 411 may delete the ambient color information instead of storing the same in the memory.

According to an embodiment of the present invention, the acquisition module 411 acquires, from an external device (e.g., a server), content corresponding to the ambient color information for the electronic device or the user. For example, the acquisition module 411 may acquire, from the external device, first content (e.g., content set to a lower intensity of illumination) when the ambient color information is first color information (e.g., darkness) and second content (e.g., content set to a higher intensity of illumination) when the ambient color information is second color information (e.g., lightness).

For example, the acquisition module 411 may acquire content corresponding to ambient color information based on the Dynamic Adaptive Streaming over hypertext transfer protocol (HTTP) (DASH) that is a streaming method according to the Moving Picture Experts Group (MPEG) standard. For example, the acquisition module 411 may receive, from an external device (e.g., a server), a chunk corresponding to ambient color information among chunks that are coding and transmission units of the DASH. For example, the acquisition module 411 may receive different chunks from an external device according to a degree (e.g., high, intermediate, or low) of ambient color information (e.g., intensity of illumination, saturation, contrast, or the like). The acquisition module 411 may receive chunks, for example, based on different bitstreams according to a degree of ambient color information. The different chunks based on the different bitstreams may be stored in an external device in advance or may be generated by the external device in real time. The acquisition module 411 may receive, from an external device, multimedia presentation description stored at a representation level such that ambient color information and content corresponding thereto are associated with each other.

According to an embodiment of the present invention, the acquisition module 411 acquires color information of content displayed through a display (e.g., the display 160). For example, the acquisition module 411 may acquire the color information of the content by reading image data on the displayed content from a memory. The acquisition module 411 may receive color information for content from a server in which the content is stored. The acquisition module 411 may acquire luminance information of content by extracting a Direct Current (DC) component included in frequency information for the content.

According to an embodiment of the present invention, the acquisition module 411 acquires information indicating the distance between the electronic device and the user or information indicating the distance between an external device and the user. For example, the acquisition module 411 may acquire information indicating the distance between the electronic device and the user through at least one distance measurement device (e.g., a camera, an ultrasonic sensor, an optical sensor, a laser sensor, or a heart rate sensor). For example, the acquisition module 411 may acquire information indicating the distance between the electronic device and the user based on the measurement result on time required until ultrasonic waves generated through an ultrasonic sensor reach the user and then return to the ultrasonic sensor again. For example, the acquisition module 411 may acquire information indicating the distance between the external device and the user based on camera-related photographing environment information (e.g., a magnification, a focus, a camera angle, a camera position, or the like).

According to an embodiment of the present invention, the acquisition module 411 acquires other ambient environment information instead of ambient color information. For example, the acquisition module 411 may acquire ambient sound information for the electronic device through an audio module 280. The acquisition module 411 may acquire ambient olfactory information for the electronic device through an odorant sensor. The acquisition module 411 may acquire at least one of the number and density of ambient objects for the electronic device through a camera module 291. Through a proximity sensor 240G or a biometric sensor 240I, the acquisition module 411 may acquire information as to whether an ambient object accesses the electronic device. The acquisition module 411 may acquire the ambient atmospheric pressure for the electronic device through an atmospheric pressure sensor 240C. The other acquired ambient environment information may be processed through the modification module 413 to be described below.

According to various embodiments of the present invention, the modification module 413 may modify color information for at least a portion of content. For example, the modification module 413 may modify at least one of a red component, a green component, a blue component, a hue, saturation, brightness, luminance, and chrominance of the content. In the case of the RGB color model, the modification module 413 may control at least one (e.g., the red component) of the red component, the green component, and the blue component of the content (e.g., reduce the amount of the red component), or may change the same into at least one other component (e.g., a blue component). When using the HSV color model, the modification module 413 may control at least one of a hue, saturation, and brightness, or may change the same into at least one other. When using the YCbCr color model, the modification module 413 may control at least one of luminance, blue chrominance, and red chrominance, or may change the same into at least one other.

The modification module 413 may modify color information for at least a portion of content based on different color models from the aforementioned color models.

According to an embodiment of the present invention, the modification module 413 may modify an edge representing the shape of an object included in content based on ambient color information for the user or the electronic device. For example, when it is determined that ambient color information (e.g., intensity of illumination) has changed from a first state (e.g., low) to a second state (e.g., high), the modification module 413 may change color information for an edge of an object to be displayed from first color information (e.g., lightness) to second color information (e.g., darkness). For example, when it is determined that the ambient color information (e.g., intensity of illumination) has changed from the first state (e.g., low) to the second state (e.g., high), the modification module 413 may change the shape of the edge of the object from a first shape (e.g., a thin shape) to a second shape (e.g., a thick shape).

According to an embodiment of the present invention, the modification module 413 may modify color information of content based on ambient color information. For example, the modification module 413 may change the color information for the content from third color information (e.g., lightness) to fourth color information (e.g., darkness) based on a determination that ambient color information for the user or the electronic device, acquired through the acquisition module 411, has changed from first color information (e.g., there are many red components) to second color information (e.g., there are a few red components). For example, based on an analysis of a degree to which the ambient color information (e.g., a blue component) has changed, the modification module 413 may change the color information (e.g., red component) of the content to a degree corresponding to the degree that the ambient color information has changed. For example, based on a determination that the numerical value of the changed ambient color information is included in a particular range, the modification module 413 may determine the degree to which the ambient color information has changed, thereby changing the color information of the content to a degree corresponding to the degree that the ambient color information has changed. The modification module 413 may change the color of the content into a color similar to an ambient color, thereby allowing the content to be adapted to the ambient color. Alternatively, the modification module may change the color of the content into a different color from the ambient color (e.g., a color complementary to the ambient color), thereby allowing the content to be clearly viewed from the ambient color.

For example, the modification module 413 may modify color information of content according to the modification of ambient color information based on the RGB color model. For example, based on a determination that at least one (e.g., blue component) of red, green, and blue components of the ambient color has increased, the modification module 413 may modify the color information of the content so that the at least one component increases (e.g., bluish). Alternatively, based on a determination that the ambient color has been changed so that the at least one component (e.g., the blue component) increases (e.g., bluish), the modification module 413 may modify the color information of the content to increase another component (e.g., a color component complementary to blue) instead of the at least one component.

For example, the modification module 413 may modify the color information of the content according to the change of ambient color information based on the HSV color model or the YCbCr color model. For example, based on the HSV color model, according to a determination that the ambient color has been changed to increase at least one of a hue, saturation, and brightness (e.g., to increase the saturation), the modification module 413 may modify the color information of the content to increase the at least one (e.g., to increase the saturation). Alternatively, based on the YCbCr color model, according to a determination that the ambient color has been changed to increase at least one of luminance, blue chrominance, and red chrominance (e.g., to increase the luminance), the modification module 413 may modify the color information of the content to increase the at least one (e.g., to increase the luminance).

According to an embodiment of the present invention, the modification module 413 modifies color information of content based on ambient color information acquired through a plurality of electronic devices. The modification module 413 may modify the color information of the content, for example, based on first ambient color information acquired by a first external device (e.g., a first sensor) and second ambient color information acquired by a second external device (e.g., a second sensor). For example, the modification module 413 may assign a first weight value to the first ambient color information based on a first distance between a user and the first external device and a second weight value to the second ambient color information based on a second distance between the user and the second external device. The modification module 413 may modify the color information of the content, for example, based on third ambient color information acquired by the electronic device and fourth ambient color information acquired by the first external device. For example, the modification module 413 may assign a third weight value to the third ambient color information based on the first distance between the user and the electronic device and a fourth weight value to the fourth ambient color information based on a fourth distance between the user and the first external device. The modification module 413 may modify the color information of the content based on the calculation (e.g., weighted averaging) for the first to fourth weighted ambient color information. For example, when the first external device (e.g., smart glasses) is closer to the user than the second external device (e.g., a TV), the modification module 413 may modify the color information of the content based on the first ambient color information which is given a greater weight value than a weight value of the second ambient color information.

According to an embodiment of the present invention, the modification module 413 may modify color information of content based on a determination as to whether an external device is connected to the electronic device. For example, the modification module 413 may identify external devices connected to the electronic device among a plurality of external devices and may modify the color information of the content only based on ambient color information acquired through the connected external devices. For example, the modification module 413 may modify the color information of the content based on a fact that a weight value is assigned to ambient color information acquired from external devices that transmit an acknowledgement signal in response to an identification signal transmitted thereto and not assigned to ambient color information previously acquired from external devices that do not transmit an acknowledgement signal.

According to an embodiment of the present invention, the modification module 413 modifies color information of content based on ambient color information acquired through a plurality of sensors included in the electronic device. The modification module 413 may modify the color information of the content, for example, based on first ambient color information acquired by a first sensor and second ambient color information acquired by a second sensor. For example, the modification module 413 may assign a first weight value to the first ambient color information based on a first location in the electronic device where the first sensor is mounted and a second weight value to the second ambient color information based on a second location where the second sensor is mounted. The modification module 413 may modify the color information of the content based on the calculation (e.g., weighted averaging) for the first and second weighted ambient color information. For example, when the first sensor is mounted on a first surface of the electronic device (e.g., a surface where a display is displayed) and the second sensor is mounted on a second surface of the electronic device (e.g., a surface opposite to the first surface with respect to the electronic device), the modification module 413 may modify the color information of the content based on the first ambient color information which is given a greater weight value than a weight value of the second ambient color information.

According to an embodiment of the present invention, the modification module 413 modifies color information of content based on ambient color information and attribute information for a display. The attribute information for the display may include, for example, color distribution, a resolution, gamma, a contrast ratio, the maximum luminance, the minimum luminance, and the like of the display. For example, when it is determined that the ambient color information includes a large amount of first color information (e.g., blue component), the modification module 413 may modify the color information of the content by analyzing the first color information (e.g., blue component) included in the attribute information for the display. For example, when it is determined that the attribute information for the display includes a large amount of first color information, the modification module 413 may reduce the amount of the first color information of the content to be modified, compared to when there is no analysis. When it is determined that the attribute information for the display includes a large amount of first color information, the modification module 413 may increase the amount of the color information of the content to be modified, compared to when there is no analysis, thereby highlighting the content.

According to an embodiment of the present invention, the modification module 413 associates ambient color information for the user or the electronic device with the user's modification history. For example, in cases where the modification module 413 provides second content obtained by modifying the color information of first content by a first change value based on ambient color information and then provides third content obtained by modifying the color information of the second content again by a second change value based on a user input, the modification module 413 may associate the ambient color information with the first change value and the second change value. For example, the modification module 413 may create a data structure (e.g., a lookup table) associated with the ambient color information, the first change value, and the second change value. For example, the modification module 413 may include, in the lookup table, at least one of location information of a sensor having acquired the ambient color information, the distance between the sensor and the user, and the distance between the sensor and the electronic device.

According to an embodiment of the present invention, the modification module 413 may modify color information of content based on ambient color information and a user's change history associated with the ambient color information. For example, when the modification module 413 provides second content obtained by modifying the color information of first content by a first change value based on ambient color information and then provides third content obtained by modifying the color information of the second content again by a second change value based on a user input, the modification module 413 may associate the ambient color information with the first change value and the second change value. For example, when modifying color information of different content based on the ambient color information, the modification module 413 may modify the color information of the different content by the sum of the first change value and the second change value. For example, the modification module 413 may modify the color information of the different content with reference to the ambient color information, the first change value, and the second change value from the lookup table.

According to an embodiment of the present invention, the modification module 413 modifies color information of content based on other ambient environment information instead of ambient color information. For example, based on a fact that ambient sound information is changed from first sound information (e.g., low sound) to second sound information (e.g., high sound), the modification module 413 may change the color information of the content from first color information (e.g., darkness) to second color information (e.g., lightness). For example, when ambient olfactory information is changed from first olfactory information (e.g., odorless) to second olfactory information (e.g., odorful), the modification module 413 may change the color information of the content from the first color information (e.g., darkness) to the second color information (e.g., lightness). For example, based on the number or density of objects adjacent to the electronic device, on whether surrounding objects access the electronic device, or the ambient atmospheric pressure for the electronic device, the modification module 413 may change the color information of the content from the first color information (e.g., darkness) to the second color information (e.g., lightness).

According to an embodiment of the present invention, the output module 415 outputs at least one piece of content through a display functionally connected to the electronic device (e.g., the electronic device 101). For example, the output module 415 may output first content and second content obtained by modifying the color information of the first content. For example, upon acquiring the second content by modifying the color information of the first content, the output module 415 may display the second content instead of the first content. Alternatively, while displaying the first content, the output module 415 may periodically change the first content to the second content, and then the second content to the third content obtained by modifying the color information of the second content.

According to an embodiment of the present invention, the output module 415 displays the changed content based on DASH, which is a streaming method according to the Moving Picture Experts Group (MPEG) standard. For example, the output module 415 may receive, from an external device (e.g., the server 106), a chunk corresponding to the ambient color information among chunks that are coding units of the DASH and may display content included in the chunk. For example, the output module 415 may receive different chunks according to a degree (e.g., high, intermediate, or low) of the ambient color information (e.g., intensity of illumination, saturation, contrast, or the like) and display content (e.g., the second content obtained by modifying the color information of the first content) included in the chunks.

For example, the output module 415 may change the first content to the second content and then the second content to the third content at every chunk interval of the Dynamic Adaptive Streaming over HTTP (DASH) which is a streaming method according to the Moving Picture Experts Group (MPEG) standard or at every multiple of the chunk interval. When a first frame (e.g., a key frame) of the first content being displayed is changed into a second frame (e.g., another key frame), the output module 415 may display a third frame corresponding to the second frame (e.g., a frame obtained by modifying color information for at least a part of the second frame) among the frames included in the second content, instead of the second frame. The output module 415 may change the first content to the second content when at least one event (e.g., a particular situation in game content) occurs in regard to content being displayed.

According to an embodiment of the present invention, when a plurality of displays is functionally connected to the electronic device, the output module 415 may display content with modified color information through each display based on the attribute information of the display. For example, the output module 415 may display the content with modified color information through each display based on ambient color information and the attribute information (e.g., color distribution, a resolution, gamma, a contrast ratio, the maximum luminance, the minimum luminance, and the like) of the display. For example, the output module 415 may display the content with modified color information through at least one of displays that use a small amount of computation or power consumption to modify the color information of the content, among the plurality of displays. In addition, the output module 415 may brightly display the content through a display having attribute information contrasting with the content having modified color information, among the plurality of displays. The output module 415 may select one of the displays, as a display to display particular content, automatically or based on a user input.

According to an embodiment of the present invention, the transmission module 417 may transmit at least one of ambient color information, content modified based on the ambient color information, and the color information of the content to an external device through a communication module functionally connected to the electronic device (e.g., the electronic device 101). For example, the transmission module 417 may transmit at least one piece of ambient color information for the electronic device or the user to an external device so that the at least one piece of ambient color information may be processed in relation to at least one piece of content in the external device. The transmission module 417 may transmit content modified based on the ambient color information to an external device so that the content may be displayed through a display included in the external device. When a frame of the displayed content is changed and/or when an event relating to the content occurs, the transmission module 417 may periodically (e.g., at every chunk interval of the DASH) transmit at least one of the ambient color information, the content modified based on the ambient color information, and the color information of the content to the external device. When a frame of the displayed content is changed and/or when an event relating to the content occurs, the transmission module 417 may periodically transmit a control signal for controlling the external device to the external device.

According to an embodiment of the present invention, the external device control module 419 controls at least one external device (e.g., a lighting device, a blind, a curtain, or a filter) based on the change of color information of content displayed through a display. For example, based on a determination that the color information of the displayed content has changed from first color information (e.g., low intensity of illumination) to second color information (e.g., high intensity of illumination), the external device control module 419 may control the external device to change an ambient environment thereof. The external device control module 419 may control the external device to adapt to the modified (e.g., brightened) color information of the displayed content (e.g., turn on a lighting device or open a curtain or a blind), or may control the external device in contrast to the modified color information of the content.

Figure 5:
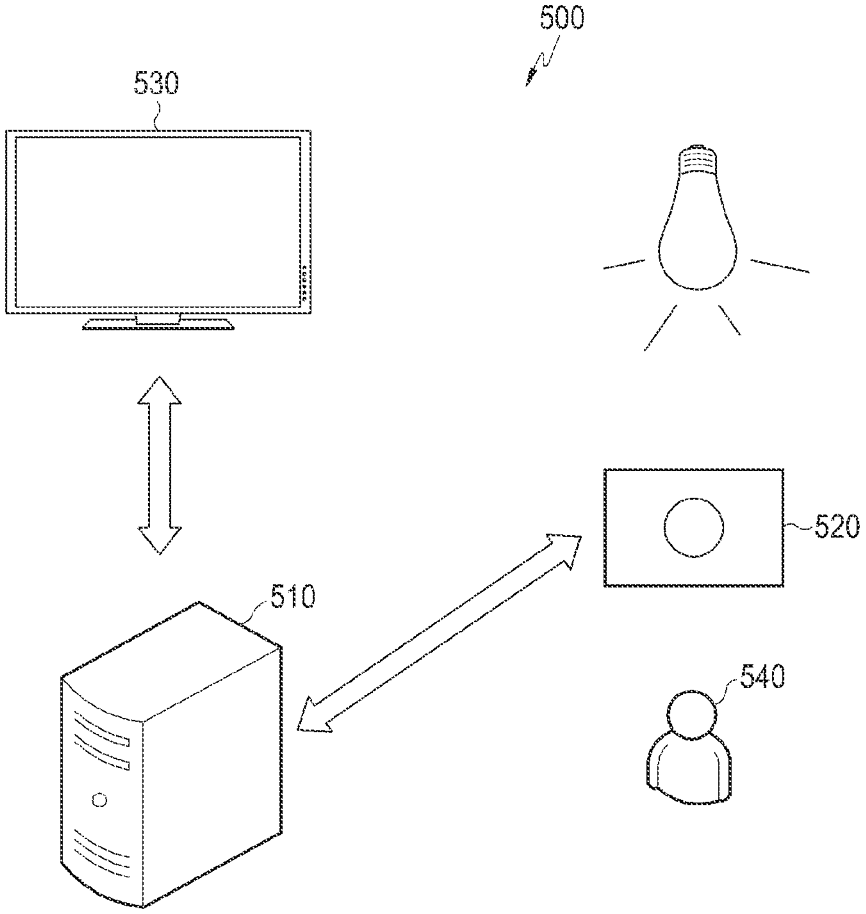
FIG. 5 is a schematic diagram illustrating a content processing system according to an embodiment of the present invention.

FIG. 5 is a schematic diagram illustrating a content processing system 500 according to an embodiment of the present invention.

Referring to FIG. 5, the content processing system 500 includes an electronic device 510 and external electronic devices 520 and 530. Any of electronic devices of FIG. 5 may be the electronic device 102 described herein with reference to FIG. 1. The electronic device 510 may include, for example, a communication module 220, a memory 230, a display 260, a sensor module 240, and a content processing module 410. The first external electronic device 520 may include a sensor and a communication module. The second external electronic device 530 may include a display, a sensor, and a content processing module. According to an embodiment of the present invention, the plurality of electronic devices 510, 520, and 530 may include only some of the above elements or may additionally include other elements. For example, the electronic device 510 may be a device (e.g., the server 106) that does not include a display or a device (e.g., a TV or a mobile device) including a display.

The sensor is a module for sensing ambient environment information (e.g., ambient color information) and may correspond to, for example, the sensor module 240 of FIG. 2. The communication module transmits and/or receives at least one of ambient environment information sensed through the sensor and content related information through wired/wireless connection with another device, and may correspond to, for example, the communication module 220 and/or the interface 270 of FIG. 2. The memory is a module for storing at least one of ambient environment information sensed through the sensor and content received through the communication module. The memory may correspond to, for example, the memory 230 of FIG. 2. The display displays at least one of acquired content and modified content based on ambient color information. The display may correspond to, for example, the display 160 of FIG. 1 and/or the display 260 of FIG. 2.

The content processing module may acquire first content from the memory or from the external electronic devices 520 and 530 through the communication module and process the first content. For example, the content processing module may acquire ambient color information for a user 540, sensed through the first external electronic device 520, from the first external electronic device 520 and process the ambient color information. The content processing module may create second content by modifying color information for the first content based on the ambient color information for the user 540. The content processing module may store the second content or the ambient color information in the memory or may transmit the same to the external electronic devices 520 and 530 through the communication module. The content processing module may correspond to, for example, the content processing module 410 of FIG. 4 and include an acquisition module 411, a modification module 413, an output module 415, a transmission module 417, or an external device control module 419.

Figure 6:
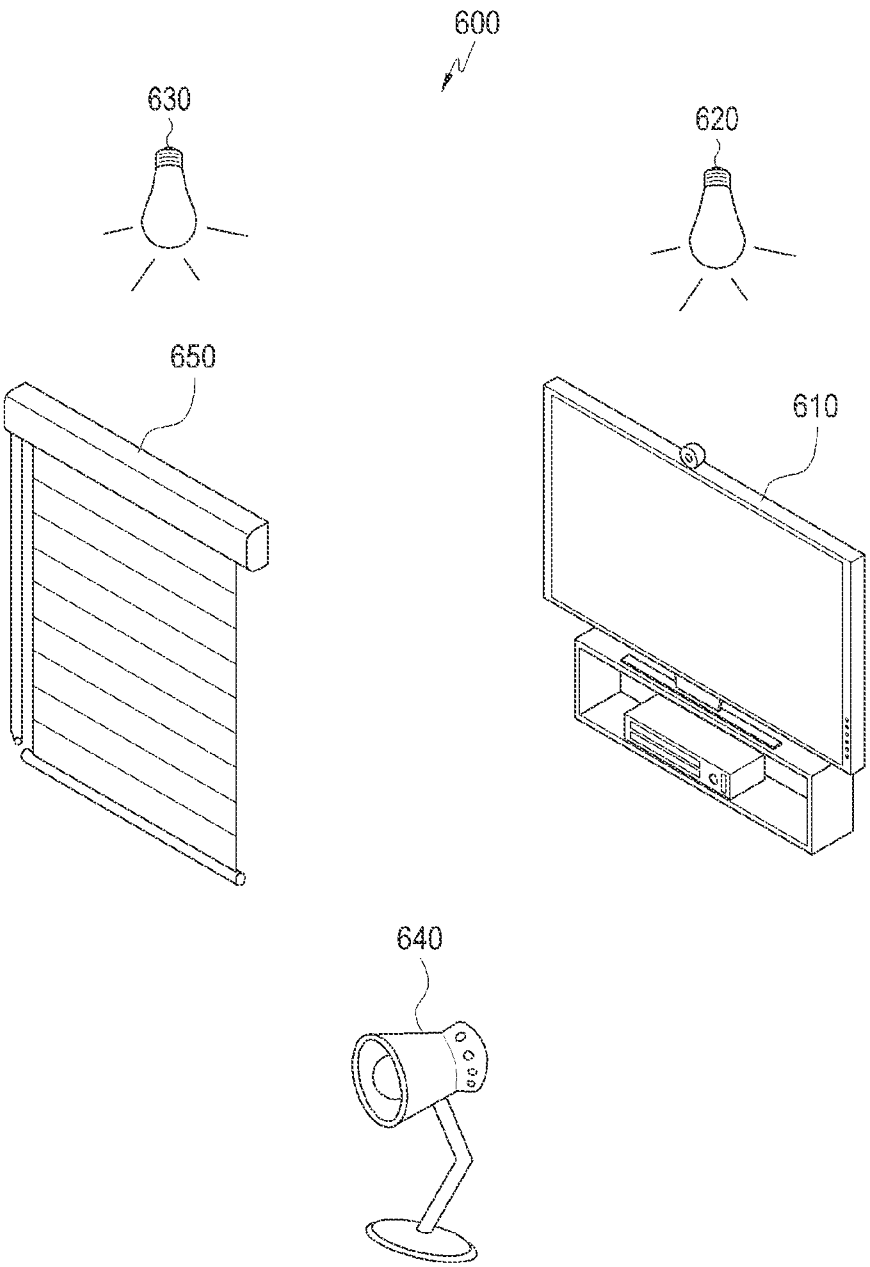
FIG. 6 is a diagram illustrating a schematic configuration of an external device control system according to an embodiment of the present invention.

FIG. 6 is a schematic diagram illustrating a configuration of an external device control system 600 according to an embodiment of the present invention. Referring to FIG. 6, the external device control system 600 includes an electronic device 610 and external devices 620, 630, 640, and 650. Any of the devices illustrated in FIG. 6 may correspond to, for example, the electronic device 102 of FIG. 1. The electronic device 610 may include, for example, a communication module 220, a display 260, and a content processing module 410. The content processing module may correspond to, for example, the content processing module 410 of FIG. 4 and include an acquisition module 411, a modification module 413, an output module 415, a transmission module 417, or an external device control module 419. The first to third external devices 620, 630, and 640 may be, for example, lighting devices that include a communication module. The fourth external device 650 may be, for example, a light shielding device (e.g., a blind, a curtain, a filter, or the like) including a communication module. Although not illustrated, the external device control system 600 may include various external devices that are functionally connected to the electronic device 610 or may communicate with the electronic device 610.

According to an embodiment of the present invention, the external device control module, included in the content processing module of the electronic device 610, controls the external devices 620, 630, 640, and 650 based on the change of color information of content displayed through the display. For example, based on a determination that the color information of the displayed content has changed from first color information (e.g., low intensity of illumination) to second color information (e.g., high intensity of illumination), the external device control module may control the external devices 620, 630, 640, and 650 to change ambient environments thereof.

According to an embodiment of the present invention, the external device control module controls at least one of the first to third external devices 620, 630, and 640 to modify emitted-color information based on color information of content. For example, if content has changed from a first intensity of illumination (e.g., darkness) to a second intensity of illumination (e.g., lightness), the external device control module may control the first external device 620 to adjust the intensity of illumination from a third intensity of illumination (e.g., darkness) to a fourth intensity of illumination (e.g., lightness). For example, if a particular color component (e.g., a red component) of content has increased (reddish), the external device control module may control the second external device 630 to modify (e.g., increase or decrease) the particular color component. For example, the external device control module may control the third external device 640 adjacent to a user to be turned on or off based on a color change of content. For example, based on a determination that content has changed to mainly use a particular color (e.g., yellow) and the third external device 640 is a device (e.g., an incandescent lamp) that mainly emits the particular color (e.g., yellow), the external device control module may control the third external device 640 to be maintained in a particular state (e.g., turned-off state).

According to an embodiment of the present invention, the external device control module may control the operation of the fourth external device 650 based on color information of content. In cases where the fourth external device 650 is a blind or curtain, the external device control module may control the fourth external device 650 to be opened or closed or to spread outward or gather toward the center thereof based on a change of color information of content from first color information (e.g., green component based) to second color information (blue component based). When the fourth external device 650 is a filter, the external device control module may control the fourth external device 650 to absorb or pass more colors therethrough based on color information of content.

According to an embodiment of the present invention, the external device control module controls the external devices 620, 630, 640, and 650 to operate to adapt or correspond to modified color information of displayed content. For example, if the color information (e.g., intensity of illumination) of the displayed content has increased (e.g., brightened), the external device control module may control the external devices to generate a larger amount of color information (e.g., to increase the luminance of a lighting device) or to pass a greater amount of color information therethrough (e.g., to open a blind or a curtain or to increase the amount of light passing through a filter). In this case, the electronic device 610 may display the content adapted for the ambient environment. Alternatively, if the color information (e.g., intensity of illumination) of the displayed content has increased (e.g., brightened), the external device control module may control the external devices to generate a lesser amount of color information (e.g., to decrease the luminance of a lighting device) or to pass a smaller amount of color information therethrough (e.g., to close a blind or a curtain or to decrease the amount of light passing through a filter). In this case, the electronic device 610 may display the content more highlighted than the ambient environment.

According to an embodiment of the present invention, the external device control module controls the external devices such that the electronic device may increase a recognition rate for an ambient object. For example, when ambient color information for the electronic device includes first color information (e.g., darkness), the external device control module may determine that the recognition of an ambient object (e.g., target recognition or motion recognition) is difficult. In this case, the external device control module may control the external devices such that the ambient color information for the electronic device is changed from the first color information (e.g., darkness) to second color information (e.g., lightness). For example, if it is difficult to recognize an ambient object, the external device control module may control the first and second external devices 620 and 630 to emit more light, the third external device 640 to be turned on, and the fourth external device 650 to pass more light therethrough (to open a blind or a curtain).

According to an embodiment of the present invention, the external device control module controls another external device (not illustrated) to modify other ambient environment information instead of ambient color information based on color information of content. For example, if the color information of the content has changed from first color information (e.g., blue) to second color information (e.g., red), the external device control module may control the other external device to change first sound information (e.g., the sound of birds) generated thereby to second sound information (e.g., the sound of insects). For example, if the color information of the content has changed from the first color information (e.g., blue) to the second color information (e.g., red), the external device control module may control the other external device to change first olfactory information (e.g., a scent of the sea) generated thereby to second olfactory information (e.g., a scent of grass). Based on a change of the color information of the content from the first color information (e.g., blue) to the second color information (e.g., red), the external device control module may control the external devices, such that other external devices gather around or move away from the electronic device, or the number of other external devices gathering around the electronic device increases or decreases.

According to an embodiment of the present invention, the external device control module controls the external devices 620, 630, 640, and 650 to gradually, periodically, or instantaneously change from performing a first operation to performing a second operation. For example, the external device control module may control the external devices 620, 630, and 640 to gradually change the color of light or the external device 650 to be gradually opened or closed for a particular time interval of displayed content. For example, the external device control module may control the external devices 620, 630, and 640 to change the color of light or the external device 650 to be opened or closed at every chunk interval of the DASH. For example, the external device control module may control the external devices 620, 630, and 640 to instantaneously change the color of light or the fourth external device 650 to be instantaneously opened or closed only when a particular event (e.g., a particular situation in a game) occurs in displayed content.

According to an embodiment of the present invention, the external device control module transmits control signals for the external devices through the transmission module 417. For example, the external device control module may directly transmit the control signals to the external devices through the transmission module. Alternatively, the external device control module may transmit the control signals to a server (e.g., a home gateway or a game manager) through the transmission module, and the server may transmit the control signals to the external devices.

According to an embodiment of the present invention, an electronic device 101 include a display 160 and a content processing module 180 functionally connected to the display, and the content processing module is configured to receive ambient color information for a user of the electronic device from a device external to the electronic device, modify color information for at least a part of first content to be output through the display based on the ambient color information for the user, and output second content with the modified color information through the display.

According to an embodiment of the present invention, the content processing module is configured to receive the first content from the external device or another device external to the electronic device.

According to an embodiment of the present invention, the ambient color information for the user includes at least one of a red component, a green component, a blue component, a hue, saturation, brightness, luminance, and chrominance.

According to an embodiment of the present invention, the display is included in the electronic device.

According to an embodiment of the present invention, the display is included in the external device or another device external to the electronic device According to an embodiment of the present invention, the content processing module is configured to transmit the second content to the external device or another device external to the electronic device.

According to an embodiment of the present invention, the content processing module is configured to periodically transmit the second content to the external device or another device external to the electronic device.

According to an embodiment of the present invention, the content processing module is configured to periodically receive the ambient color information for the user from the external device.

According to an embodiment of the present invention, the electronic device may include a server.

According to an embodiment of the present invention, the content processing module is configured to further modify the color information based on ambient color information for the electronic device.

According to an embodiment of the present invention, the ambient color information for the electronic device is acquired through at least one sensor included in the electronic device.

According to an embodiment of the present invention, the at least one sensor includes a first sensor and a second sensor, and the content processing module is configured to acquire first ambient color information relating to a first direction for the electronic device through the first sensor, acquire second ambient color information relating to a second direction for the electronic device through the second sensor, and determine the ambient color information for the electronic device based on the first and second ambient color information.

According to an embodiment of the present invention, the content processing module is configured to acquire information indicating a first distance between the external device and the user and information indicating a second distance between the electronic device and the user, assign a first weight value to the first ambient color information based on the first distance, and assign a second weight value to the second ambient color information based on the second distance.

According to an embodiment of the present invention, the external device includes a first external device and a second external device, the ambient color information for the user includes first ambient color information acquired by the first external device and second ambient color information acquired by the second external device, and the content processing module is configured to acquire information indicating a first distance between the first external device and the user and information indicating a second distance between the second external device and the user, assign a first weight value to the first ambient color information based on the first distance, and assign a second weight value to the second ambient color information based on the second distance.

According to an embodiment of the present invention, the external device includes at least one of an electronic device that is to be worn on the user's body and a microphone and a lighting device which are located around the user.

According to an embodiment of the present invention, an electronic device 101 includes a display 160 and a content processing module 180 functionally connected to the display, and the content processing module is configured to display first content through the display, display second content having at least one piece of different color information from the first content, and control at least one external device to the electronic device based on the at least one piece of color information.

According to an embodiment of the present invention, the content processing module is configured to identify a difference in intensity of illumination between the first and second content based on the at least one piece of color information and modify the intensity of illumination of the at least one external device based on the difference in the intensity of illumination.

According to an embodiment of the present invention, the content processing module is configured to control the external device based on a determination that at least one event has occurred.

According to an embodiment of the present invention, the content processing module is configured to acquire ambient color information for the electronic device by at least one sensor included in the electronic device, acquire information indicating a first distance between the electronic device and the user and information indicating a second distance between the external device and the user, assign a first weight value to the first ambient color information based on the first distance and a second weight value to the second ambient color information based on the second distance, and acquire the second content based on the first ambient color information reflecting the first weight value and the second ambient color information reflecting the second weight value.

Figure 7:
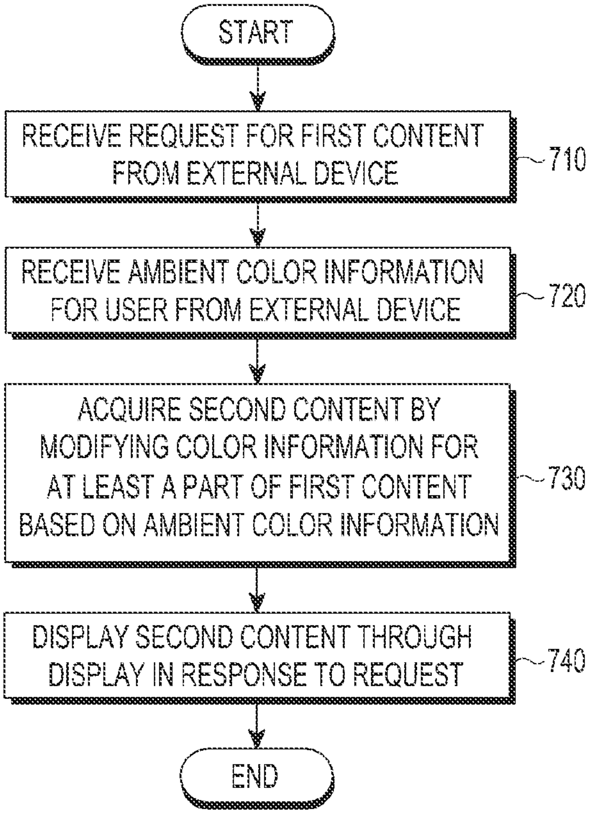
FIG. 7 is a flowchart illustrating a method of processing content by an electronic device, according to an embodiment of the present invention.

FIG. 7 is a flowchart illustrating a method of processing content by an electronic device according to an embodiment of the present invention. The electronic device of FIG. 7 may correspond to, for example, the electronic device 101 of FIG. 1.

Referring to FIG. 7, in step 710, the electronic device (e.g., the acquisition module 411 within an electronic device) receives a request for first content from a device external to the electronic device. For example, the request may be a request for providing (e.g., displaying or transmitting) content through the electronic device.

In step 720, the electronic device (e.g., the acquisition module 411) receives ambient color information for a user from the external device. According to an embodiment of the present invention, the electronic device may periodically (e.g., at every chunk interval of the DASH) receive, from the external device, ambient color information acquired through the external device. The electronic device may store the received ambient color information, for example, in a memory 130.

In step 730, the electronic device (e.g., the modification module 413 within an electronic device) acquires second content by modifying color information for at least a part of the first content based on the ambient color information. According to an embodiment of the present invention, the electronic device may acquire the second content by modifying the color information for at least a part of the first content based on the ambient color information for the user and ambient color information for the electronic device.

In step 740, the electronic device (e.g., the output module 415 within an electronic device) displays the second content through a display functionally connected to the electronic device, in response to the request. According to an embodiment of the present invention, the electronic device may periodically change the first content to the second content and then change the second content to the third content. The electronic device may change the first content to the second content, for example, based on the occurrence of a particular event. The display may be located in the interior of or on the exterior of the electronic device.

Figure 8:
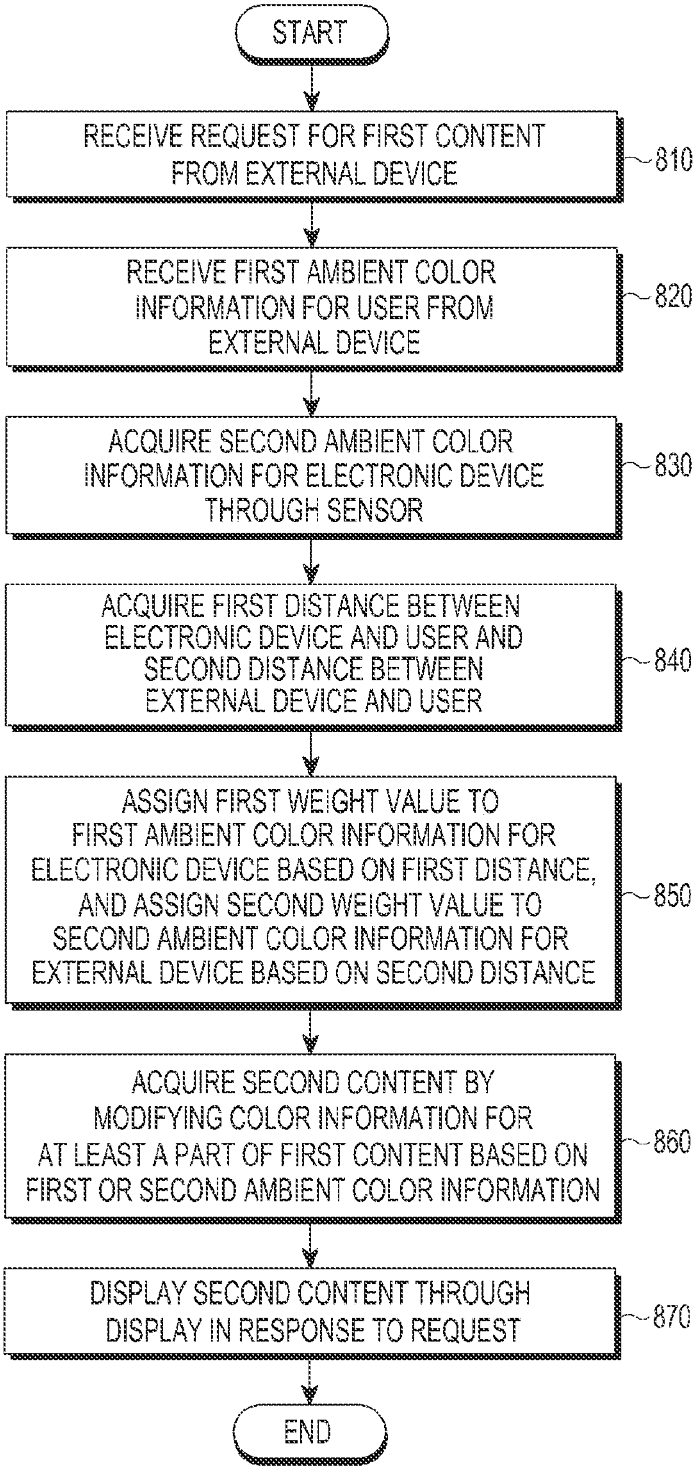
FIG. 8 is a flowchart illustrating a method of processing content by an electronic device, according to an embodiment of the present invention.

FIG. 8 is a flowchart illustrating a method of processing content by an electronic device according to an embodiment of the present invention. The electronic device of FIG. 8 may correspond to, for example, the electronic device 101 of FIG. 1.

Referring to FIG. 8, in step 810, the electronic device (e.g., the acquisition module 411) receives a request for first content from a device external to the electronic device.

In step 820, the electronic device (e.g., the acquisition module 411) receives ambient color information for a user from the external device. According to an embodiment of the present invention, the electronic device may periodically (e.g., at every chunk interval of the DASH) receive, from the external device, ambient color information acquired through the external device.

In step 830, the electronic device (e.g., the acquisition module 411) acquires ambient color information for the electronic device from a sensor. According to an embodiment of the present invention, the electronic device may acquire the ambient color information for the electronic device through at least one of a first sensor mounted on a first surface of the electronic device and a second sensor mounted on a second surface of the electronic device. The electronic device may store the received ambient color information, for example, in a memory 130.

In step 840, the electronic device (e.g., the acquisition module 411) may acquire information indicating a first distance between the electronic device and the user and information indicating a second distance between the external device and the user. According to an embodiment of the present invention, the electronic device may acquire information indicating the first distance and information indicating the second distance through at least one distance measurement device (e.g., a camera, an ultrasonic sensor, an optical sensor, a laser sensor, or a heart rate sensor).

In step 850, the electronic device (e.g., the modification module 413) assigns a first weight value to the first ambient color information for the electronic device based on the first distance and a second weight value to the second ambient color information for the external device based on the second distance. According to an embodiment of the present invention, the electronic device acquires ambient color information by calculating (weighted averaging) the first and second ambient color information based on the first and second weight values.

In step 860, the electronic device (e.g., the modification module 413) acquires second content by modifying color information for at least a part of the first content based on the ambient color information. According to an embodiment of the present invention, the electronic device may acquire the second content by modifying the color information for at least a part of the first content based on the calculated ambient color information.

In step 870, the electronic device (e.g., the output module 415) displays the second content through a display functionally connected to the electronic device, in response to the request. According to an embodiment of the present invention, the electronic device may periodically change the first content to the second content and then the second content to the third content again. Alternatively, the electronic device may change the first content to the second content, for example, based on the occurrence of a particular event.

According to various embodiments, a content processing method may include receiving a request for first content from a device external to an electronic device, receiving ambient color information for a user of the electronic device from the external device, acquiring second content with modified color information for at least a part of the first content, based on the ambient color information, and displaying the second content through a display, functionally connected to the electronic device, in response to the request, in the electronic device 101.

According to an embodiment of the present invention, acquiring of the second content includes acquiring ambient color information for the electronic device by at least one sensor included in the electronic device, acquiring information indicating a first distance between the electronic device and the user and information indicating a second distance between the external device and the user, assigning a first weight value to the first ambient color information based on the first distance and a second weight value to the second ambient color information based on the second distance, and acquiring the second content based on the first ambient color information reflecting the first weight value and the second ambient color information reflecting the second weight value.

According to an embodiment of the present invention, receiving the request includes receiving the first content from the external device or another device external to the electronic device.

According to an embodiment of the present invention, the content processing method may further include transmitting the second content to the external device or the another device external to the electronic device.

According to an embodiment of the present invention, displaying the second content includes periodically transmitting the second content to the external device or the other external device.

According to an embodiment of the present invention, receiving the ambient color information includes periodically receiving the ambient color information for the user from the external device.

According to an embodiment of the present invention, acquiring the second content includes modifying the color information additionally based on ambient color information for the electronic device.

According to an embodiment of the present invention, the at least one sensor includes a first sensor and a second sensor, and receiving the ambient color information includes acquiring first ambient color information relating to a first direction for the electronic device through the first sensor, acquiring second ambient color information relating to a second direction for the electronic device through the second sensor, and determining the ambient color information for the electronic device based on the first and second ambient color information.

According to an embodiment of the present invention, acquiring the second content may include acquiring information indicating a first distance between the external device and the user and information indicating a second distance between the electronic device and the user, assigning a first weight value to the first ambient color information based on the first distance, and assigning a second weight value to the second ambient color information based on the second distance.

According to an embodiment of the present invention, the external device includes a first external device and a second external device, the ambient color information for the user may include first ambient color information acquired by the first external device and second ambient color information acquired by the second external device, and acquiring the second content may include acquiring information indicating a first distance between the first external device and the user and information indicating a second distance between the second external device and the user, assigning a first weight value to the first ambient color information based on the first distance, and assigning a second weight value to the second ambient color information based on the second distance.

According to an embodiment of the present invention, an electronic device (e.g., the electronic device 101 of FIG. 1) displays first content, displays second content having at least one piece of color information different from color information of the first content, and controls at least one device external to the electronic device, based on the at least one piece of different color information.

According to an embodiment of the present invention, controlling at least one device external to the electronic device includes identifying a difference in intensity of illumination between the first and second content based on the at least one piece of color information and modifying the intensity of illumination of the at least one external device based on the difference in the intensity of illumination.

According to an embodiment of the present invention, controlling the at least one external device includes controlling the external device based on a determination that at least one event has occurred.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. An electronic device comprising:

a display interface functionally connecting a processor to a display;

a communication interface;

at least one sensor; and wherein the processor is configured to:

acquire ambient color information of the electronic device through the at least one sensor, receive, from at least one external device of the electronic device, ambient color information of the at least one external device through the communication interface, modify color information for at least a part of first content to be output through the display based on the acquired ambient color information of the electronic device and the received ambient color information of the at least one external device, and output, based on the modified color information, second content having the modified color information, through the display.

2. The electronic device of claim 1, wherein the at least one external device comprises a first external device, and wherein the processor is further configured to receive the first content from the first external device or a second device external to the electronic device.

3. The electronic device of claim 1, wherein the received ambient color information of the external device includes at least one of a red component, a green component, a blue component, a hue, saturation, brightness, luminance, and chrominance.

4. The electronic device of claim 1, wherein the display is included in the electronic device.

5. The electronic device of claim 1, wherein the at least one external device comprises a first external device and a second external device, and wherein the display is included in the first external device or the second external device.

6. The electronic device of claim 5, wherein the processor is further configured to transmit the second content to the first external device or the second external device.

7. The electronic device of claim 6, wherein the processor is further configured to periodically transmit the second content to the first external device or the second external device.

8. The electronic device of claim 1, wherein the processor is further configured to periodically receive the ambient color information of the at least one external device from the at least one external device through the communication interface.

9. The electronic device of claim 1, wherein the electronic device comprises a server.

10. The electronic device of claim 1, further comprising a first sensor and a second sensor, and the processor is further configured to acquire first ambient color information relating to a first direction relative to the electronic device through the first sensor, acquire second ambient color information relating to a second direction relative to the electronic device through the second sensor, and determine the ambient color information for the electronic device based on the first and second ambient color information.

11. The electronic device of claim 1, wherein the processor is further configured to acquire information indicating a first distance between the at least one external device and a user and information indicating a second distance between the electronic device and the user, assign a first weight value to the first ambient color information based on the first distance, and assign a second weight value to the second ambient color information based on the second distance.

12. The electronic device of claim 1, wherein the ambient color information of the at least one external device comprises first ambient color information acquired by a first external device and second ambient color information acquired by a second external device, and wherein the processor is further configured to acquire information indicating a first distance between the first external device and the user and information indicating a second distance between the second external device and the user, assign a first weight value to the first ambient color information based on the first distance, and assign a second weight value to the second ambient color information based on the second distance.

13. The electronic device of claim 1, wherein the at least one external device comprises at least one of:

a wearable device that is to be worn on a user's body, a microphone that is located around the user, and a lighting device that is located around the user.

14. An electronic device comprising:

a display;

a communication interface; and a processor configured to display first content through the display, determine whether a color information of the first content is changed, and control at least one external device, which is connected to the electronic device through the communication interface, based on a determination that the color information of the displayed first content is changed.

15. The electronic device of claim 14, wherein the processor is further configured to:

display second content having at least one piece of different color information from color information of the first content, determine a difference between an intensity of illumination of the first content and an intensity of illumination of the second content based on the at least one piece of color information, and modify the intensity of illumination of the at least one external device based on the determined difference in the intensity of illumination.

16. The electronic device of claim 14, wherein the processor is further configured to control the at least one external device based on a determination that at least one event has occurred.

17. A method for adapting content based on an ambient environment of an electronic device, comprising:

acquiring ambient color information of the electronic device through at least one sensor of the electronic device;

receiving, from at least one external device, ambient color information of the at least one external device through a communication interface of the electronic device;

acquiring second content by modifying color information for at least a part of first content, based on the acquired ambient color information of the electronic device and the received ambient color information of the at least one external device; and displaying the acquired second content through a display functionally connected to the electronic device.

18. The method of claim 17, wherein acquiring the second content comprises:

acquiring, by the at least one sensor, first ambient color information relating to a first direction relative to the electronic device and second ambient color information relating to a second direction relative to the electronic device;

acquiring information indicating a first distance between the electronic device and a user and information indicating a second distance between the at least one external device and the user;

assigning a first weight value to the first ambient color information based on the first distance and a second weight value to the second ambient color information based on the second distance; and acquiring, by at least one distance measurement device, the second content based on the first ambient color information reflecting the first weight value and the second ambient color information reflecting the second weight value.

* * * * *